Jan. 9, 1940. L. BRYAN ET AL 2,186,361
APPARATUS FOR COATING PIPE
Filed Oct. 22, 1938 4 Sheets-Sheet 1

INVENTORS
Lloyd Bryan
William R. Postlewaite

BY *[signature]*
ATTORNEY

Jan. 9, 1940. L. BRYAN ET AL 2,186,361
APPARATUS FOR COATING PIPE
Filed Oct. 22, 1938   4 Sheets-Sheet 2

INVENTORS
Lloyd Bryan
William R. Postlewaite
BY
ATTORNEY

INVENTORS
Lloyd Bryan
William R. Postlewaite
BY
ATTORNEY

INVENTORS.
Lloyd Bryan
William R. Postlewaite

Patented Jan. 9, 1940

2,186,361

UNITED STATES PATENT OFFICE 2,186,361

APPARATUS FOR COATING PIPE

Lloyd Bryan, Los Angeles, and William R. Postlewaite, San Francisco, Calif., assignors to Standard Oil Company of California, San Francisco, Calif., a corporation of Delaware Application October 22, 1938, Serial No. 236,410

12 Claims. (Cl. 25—38)

This invention relates to pipe coating apparatus which is adapted to apply a relatively thick coating of a dense plastic material such as a bituminous mastic to the outer surface of a pipe and particularly refers to a readily portable apparatus which is adapted to propel itself along a pipeline of considerable length which is temporarily raised above the surface of the earth and is subsequently intended to be buried in a trench.

Heretofore it has been the practice to wrap continuous pipelines with strips of felt, paper or asbestos, which are saturated with waterproofing materials such as asphalt, coal tar pitch, grease and the like. These wrappings are applied helically and form a corrosion-resistant protection to the pipe only so long as they are not damaged by movements of the earth, concentration of stress due to rocks or clods, or natural disintegration from soil moisture. In an attempt to provide a more permanent coating, a relatively thick layer of initially plastic waterproofing material, such as bituminous mastic, has been applied to individual lengths of pipe which are subsequently connected together by welding and the uncoated joints covered by hand or with suitable molds. A material of this nature is described in Patent No. 1,984,649, issued December 18, 1934, to C. S. McDonald et al. Apparatus suitable for applying this material to successive lengths of pipe is disclosed in Patent No. 2,040,876 issued May 19, 1936, to William R. Postlewaite and in the copending patent application Serial No. 222,207, filed July 30, 1938, by the same inventor.

It has been found desirable to develop an apparatus which could continuously apply such a bituminous mastic to a pipeline which is already coupled together in one continuous length and which may extend for miles without a break. Such an apparatus would permit the coating of pipelines which are already in place and would make available the benefits of the thick mastic coating of the McDonald Patent No. 1,984,649 with improvements which have been made in that material. Exhaustive tests by the United States Bureau of Standards and the American Petroleum Institute have shown such a coating to be far more enduring and efficient than a simple layer of bituminous material, such as asphalt or coal tar, or the helical wrap and impregnated felt or asbestos coatings which have so far been applied to pipelines which are in place.

The usual field of application for an apparatus embodying this invention is to apply a thick mastic coating to a pipeline which has been buried in the earth for some time. This pipeline is customarily uncovered, lifted to the surface and placed upon suitable supports, cleaned of any former coating and rust, painted with a primer material which may be a bituminous paint, and then continuously coated with a layer ranging from ⅜ to ¾ inch of an asphaltic or bituminous mastic composed of a carefully graded mineral aggregate with a binder of about 8 to 15% bituminous material such as asphalt or the like. By the use of this apparatus this coating is continuously and rapidly applied and is not interrupted for joints, couplings, welds, or bends or similar irregularities in the pipeline. After the coating is applied it may be immediately lowered into place in the trench from which it was removed, or, in the case of a new installation, into a trench which has been prepared for its reception.

It is an object of this invention to provide a device for applying a dense mastic coating to pipe or similar cylindrical objects in which a continuous coating of mastic is formed upon the pipe without joints, voids, irregularities in thickness or other difficulties which would interfere with the protective nature of the coating.

Another object of the invention is to provide an apparatus which will travel along a continuous length of pipe, for example several miles at a time, without leaving spaces or joints which require subsequent coating or patching.

Another object of the invention is to provide an apparatus for applying a mastic coating to a pipe which will follow bends or irregularities in the pipe and which is self-centering to automatically apply a coating which will be uniform in thickness around the circumference of the pipe.

Another object of the invention is to provide a device for applying a coating of dense mastic to a pipe in which this material is initially compressed around the pipe and is further compacted by being drawn through a tapered encircling die.

Another object is to provide an improved means for pumping a plastic bituminous mastic which is substantially solid at temperatures below 200° F. and becomes only slightly plastic at temperatures of approximately 400° F. and comprises a graded aggregate of substantially maximum density and containing from about 8 to 15% of bituminous material as a binder.

Another object is to provide an improved traction unit and means for connecting it to a concentric extrusion die which is adapted to apply a relatively thick coating of a plastic material to the outer surface of a pipe.

These and other objects and advantages will be more fully apparent from the following description and from the drawings which form a part of this specification and illustrate a preferred embodiment of the invention.

Figure 1:
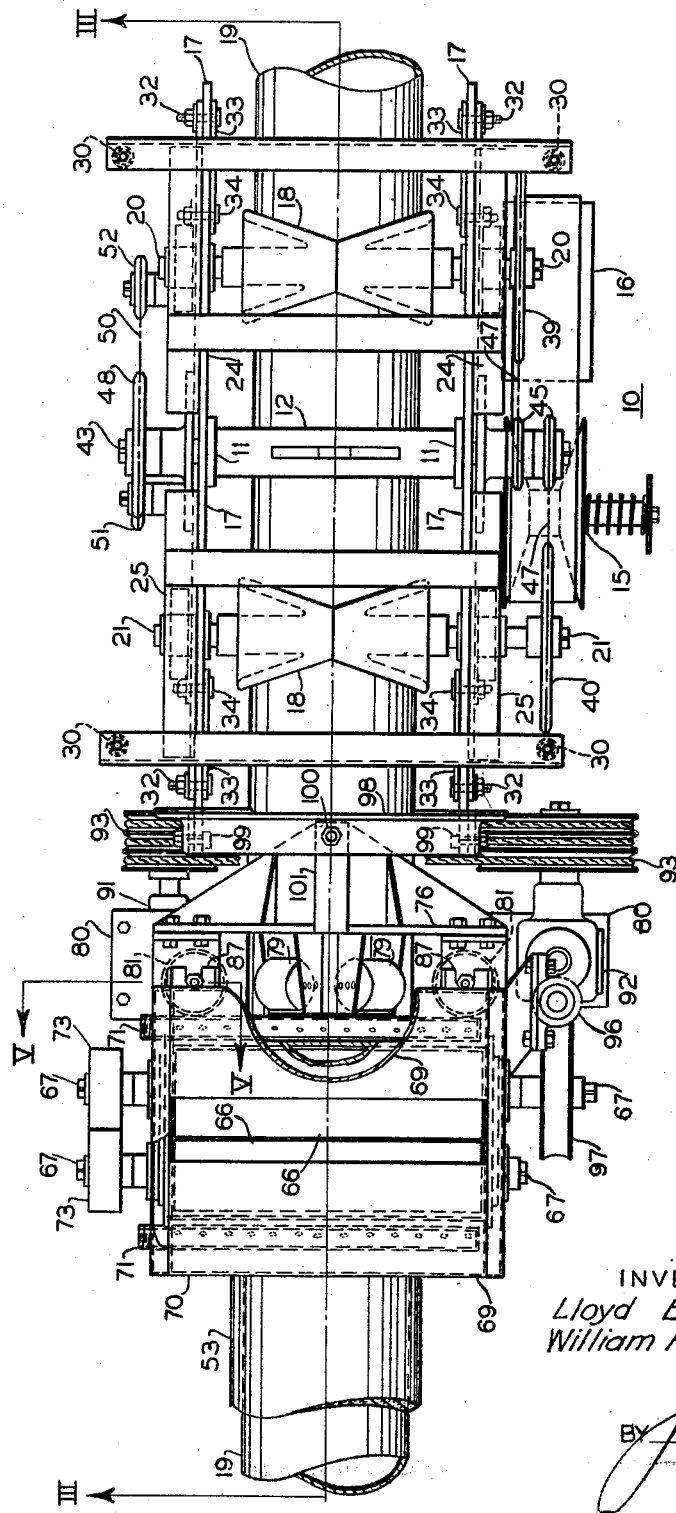
Figure 1 is a plan of the device in place upon a pipe along which it is adapted to travel to coat the same.

Referring to the drawings: It will be noted that the device of this example comprises a tractor unit for continuously and controllably advancing the apparatus along a pipe; a mastic extrusion nozzle adapted to follow the tractor unit; a flexible coupling means for securing the two together in such a manner that they may follow bends and irregularities in the pipe being coated; and a mastic pump preferably mounted above the nozzle and adapted to receive a previously mixed bituminous mastic and to compress it into the nozzle and around the pipe so that a firm, dense and homogeneous coating will be produced.

Figure 2:
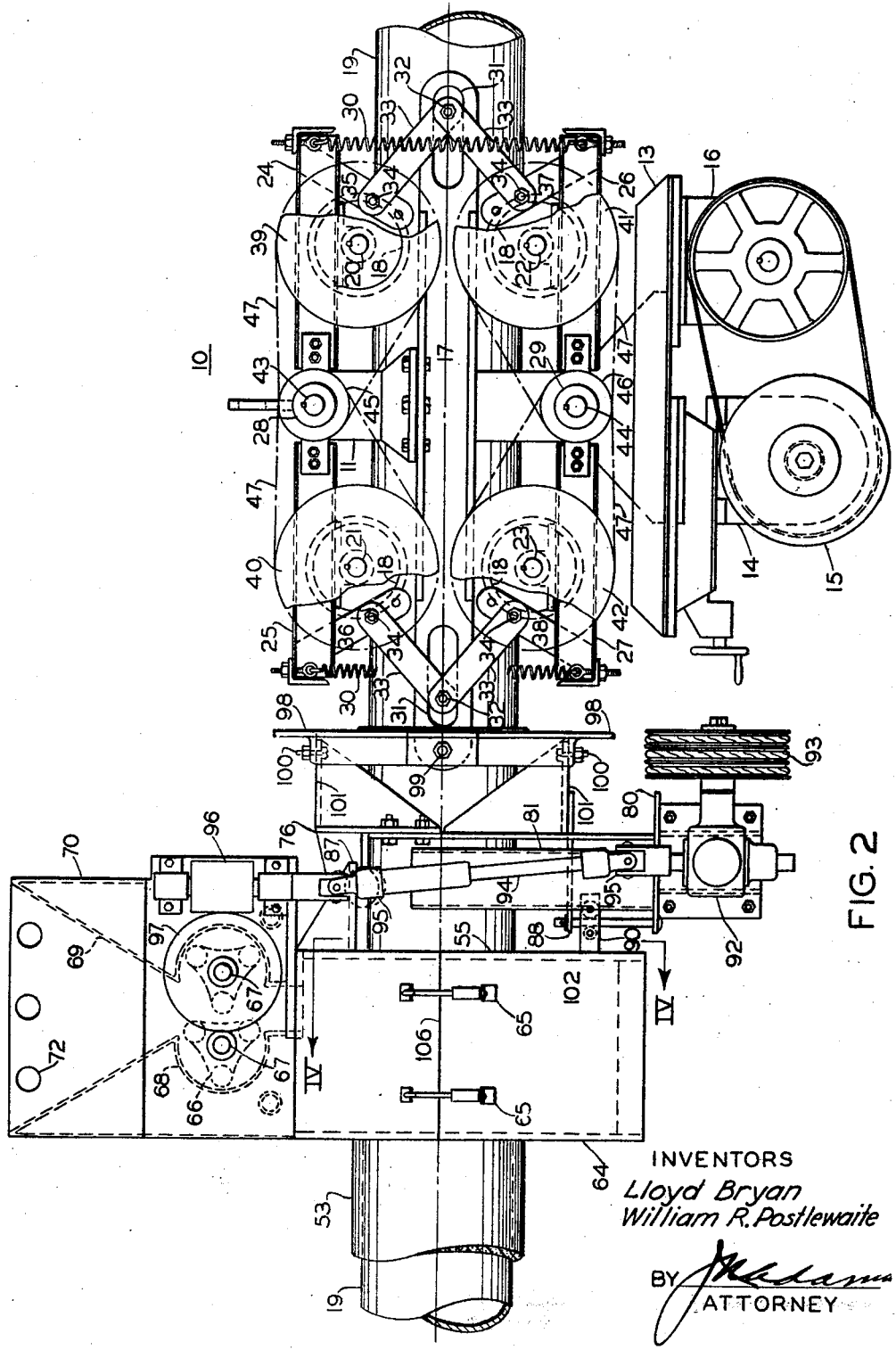
Figure 2 is a side elevation of the apparatus shown in Figure 1.

The tractor unit is similar in some respects to that illustrated in the copending patent application Serial No. 222,207, filed July 30, 1938, by William R. Postlewaite, one of the co-inventors of this present application. Referring to Figures 1 and 2, the tractor unit, generally designated 10, comprises a pair of vertical side members 11 joined at their upper and lower extremities by transverse tubular members 12 to form a rectangular frame which surrounds the pipe. Secured to the lower part of the frame thus formed is a platform 13 to support motor 14, variable speed mechanism 15 and reducing gear 16. Between the ends of side members 11 and extending therefrom in a direction parallel to the pipe axis are a pair of centering bars 17, the rear ends of which also form a point of attachment for the flexible yoke connection which will be discussed below. As the tractor unit 10 is symmetrical about its horizontal axis, it may be turned over so that motor 14 and its associated drive means are above instead of below the pipe.

The drive means which actually engage the pipe and serve to move the tractor unit relatively thereto, comprise two pairs of generally concave rolls 18 disposed above and below the pipe 19 which is to be coated, each pair supported to move upwardly and downwardly respectively when enlargements such as welds or couplers pass through the tractor unit. This is accomplished by securing rolls 18 on shafts 20, 21, 22 and 23, which are journalled respectively on upper bifurcated swinging arms 24 and 25 and lower bifurcated swinging arms 26 and 27. Upper swinging arms 24 and 25 are pivoted at their inner ends 28 on opposite sides of upper tubular cross member 12 and lower swinging arms 26 and 27 are similarly pivoted at 29 on lower tubular member 12 of the frame of the tractor unit 10. By this construction, when the tractor unit meets with an enlargement in line 19, rolls 18 on shafts 20 and 22 will swing upwardly and downwardly respectively about bearings 28 and 29 in the frame of the unit. When this obstruction has passed these rolls they will resume their former position and rolls 18 on shafts 21 and 23 will spread apart and return together in a similar fashion. In order to urge these rolls firmly against pipe 19, springs 30 are provided, connecting the outer ends of swinging arms 24 and 26, and 25 and 27, respectively.

It is desirable to insure that upper swinging arms 24 and 25 and lower swinging arms 26 and 27 will move upwardly and downwardly through the same angle so that the tractor unit will remain centered with respect to the center of the pipe 19. In this example such alignment is provided by centering bars 17, slotted at each end 31 to receive rollers 32 at the outer ends of links 33, which are pivoted at 34 to brackets 35, 36, 37 and 38, respectively secured to swinging arms 24, 25, 26 and 27.

Figure 3:
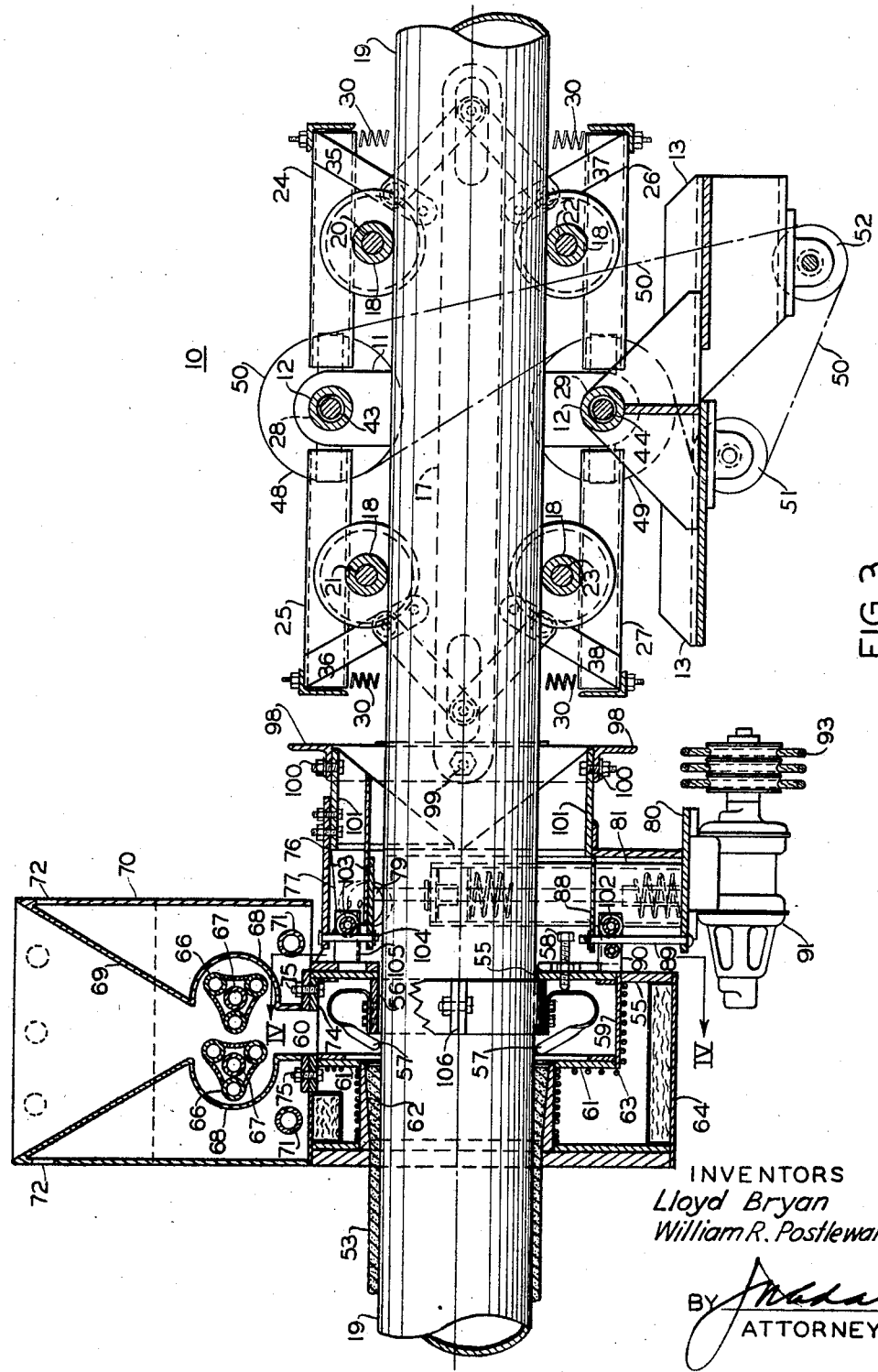
Figure 3 is a vertical sectional view on line III—III of Figure 1 and illustrates the extrusion nozzle and mastic pump in some detail.

Shafts 20, 21, 22 and 23 are provided respectively with sprockets 39, 40, 41 and 42. Upper and lower tubular members 12 are adapted to support upper and lower transverse center shafts 43 and 44. Shaft 43 is provided with two sprockets 45 mounted side by side, and shaft 44 is similarly provided with two sprockets 46 mounted in the same manner. Flexible link chains 47 connect upper sprockets 45 with roll sprockets 39 and 40 respectively. Sprockets 46 are similarly connected to roll sprockets 41 and 42. At the opposite ends of shafts 43 and 44 from sprockets 45 and 46 are single sprockets 48 and 49, respectively (Figure 3). Flexible drive chain 50 is adapted to pass successively around these latter sprockets and around an idler sprocket 51 to main drive sprocket 52 on speed reducing gear 16. In this example sprocket 52 is rotated in a clockwise direction, thereby giving sprocket 48 a similar direction of motion and by the arrangement of chain 50 giving sprocket 49 a counter-clockwise direction of rotation. These motions will rotate sprockets 45 and shafts 20 and 21 in a clockwise direction and will rotate sprockets 46 and shafts 22 and 23 in a counter-clockwise direction, thus urging rollers 18 to advance tractor unit 10 in the direction indicated.

Figure 4:
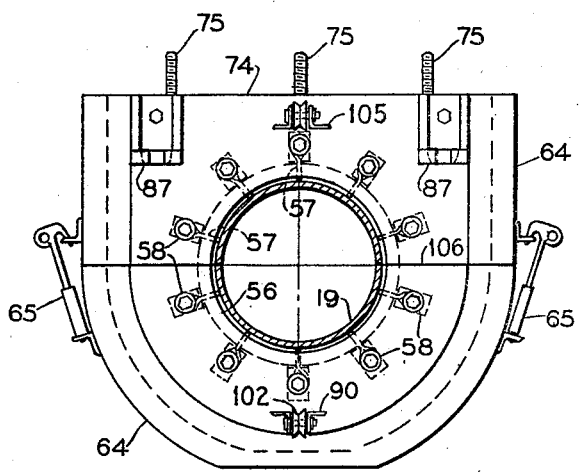
Figure 4 is a transverse sectional view on line IV—IV of Figure 3 showing the advancing face of the extrusion nozzle and the casing therefor.

The mastic extrusion nozzle is best illustrated in Figures 3 and 4 and comprises generally a support plate 55 to which is secured a backwardly extending tubular inlet member 56, the inside diameter of the latter being adequate to admit the passage of pipe 19 and any outwardly extending welds or couplers that may be in pipe 19. The consistency of the preferred material for which this device is adapted is so stiff that there will normally be no leakage through the annular opening thus left around pipe 19, particularly during the forward motion of the nozzle on the pipe so that no special sealing means is required at this point. A plurality of centering springs 57 are suitably secured to member 56 and serve to maintain it in approximate alignment with the outer surface of pipe 19. Adjusting screws 58 are preferably provided so that centering members 57 may be positioned to keep the nozzle in place on the pipe and yet permit passage of couplers and the like.

It will be appreciated that the mastic for which this apparatus is particularly designed is not liquid and is only relatively slightly plastic at temperatures of 300 to 400° F. For this reason it is desirable that the path of the mastic through the nozzle and to all parts of the circumference of the pipe below as well as above the axis should be as short and direct as possible. It is also desirable that the nozzle be relatively short in the direction of its motion so that the mastic will not remain in it for a very long period of time and also that it may follow bends and irregularities in the direction of the pipe without being crowded sideways, which would produce a thinner coating on one side of the pipe than on the other. In this example the means forming the chamber through which the mastic passes to encircle the pipe comprise a U-shaped member 59 which extends downwardly from a mastic inlet opening 60 to surround the lower part of the pipe 19. Inlet 60 is preferably as wide as the widest dimension of U-shaped member 59 so that mastic will travel the least possible distance to contact pipe 19. A flat back plate 61, together with member 59 and front plate 55, form the mastic receiving and distributing chamber. The outlet of this chamber is preferably formed by a conical member 62 secured to back plate 61 and aligned with inlet tube 56, the smallest dimension being at the discharge end, and the conical section serving further to compress and compact the dense and stiff material to form a homogeneous and firmly adhering coating. The chamber may be split as at 106 to facilitate assembly on pipe 19.

Because the preferred plastic material is substantially unworkable at temperatures below 200° F., it is desirable to surround the mastic receiving chamber, comprising members 55, 59, 61 and 62, with heating elements of some kind, in this example electric resistance units 63, which may be supplied from a suitable source of electric power. An insulating jacket 64, which may be in several parts and adapted to be clamped together by latches 65, surrounds the mastic receiving and extrusion chamber or nozzle and serves to conserve the heat which is applied to that unit of this device.

Due to the stiff and refractory nature of the mastic material for which this device is particularly adapted, it is essential that that material may be forced into mastic inlet opening 60 by some form of positive feed means preferably acting across the entire width of that opening. In this example such means comprise a pair of three-lobed impellers 66 supported on shafts 67 to rotate toward their common center within semi-cylindrical recesses in members 68. An inwardly tapering hopper 69 serves to receive mastic 53 from any suitable mixer and to direct it into the space between impellers 66 so that it will pass downwardly into the extrustion nozzle chamber. In order to maintain the mastic pump and the mastic centering hopper 69 at a temperature of 300 to 400° it is desirable to provide suitable heating means. In this case a metal jacket 70 surrounds the pump and hopper and is provided with gas burner pipes 71 supplied from any portable source, such as a tank of liquefied petroleum gas. Suitable vents 72 near the top of jacket 70 serve to remove products of combustion from the jacket. Referring to Figure 1, it will be noted that shafts 67 of the mastic pump are positively interconnected by means of gears 73 at one end of that structure. These serve to maintain impellers 66 in the proper position to force mastic through the pump body and into the extrusion nozzle across the entire width of the latter. Sufficient clearance must obviously be provided between the two impellers and between the impellers and recessed members 68 so that the particles of mineral aggregate in the mastic being handled, which may range up to about ⅛ inch in diameter, will pass freely between these members.

The mastic pump unit is supported upon the upper end of the extrusion nozzle and is illustrated as being bolted to a horizontal plate 74 at the top of the nozzle. This is preferably separable from the pump and may be secured thereto by means of studs 75.

In this example, a rectangular frame 76 surrounds pipe 19 between the rear end of tractor unit 10 and the extrusion nozzle. The upper end of frame 76 is provided with brackets 77 in which are received two shafts 78 for support rollers 79. At the bottom of frame 76 is a transverse plate 80 on each end of which is a spring mounting 81 (Figure 5) serving to guide and also to urge forwardly the mastic extrusion nozzle.

Figure 5:
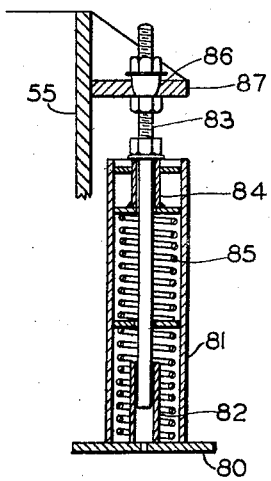
Figure 5 is a vertical sectional view on line V—V of Figure 1 showing a detail of the nozzle spring support.
Figure 6:
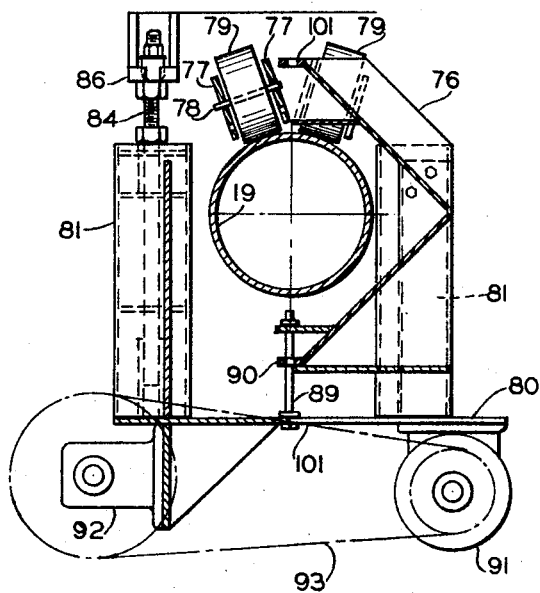
Figure 6 is a transverse sectional view on line VI—VI of Figure 2 showing details of the roller-supported yoke and its mode of attachment to the nozzle.

Referring to Figure 5, it will be noted that each spring mounting consists generally of a tubular guide member 81 in the lower part of which and concentric therewith is a hollow rod guide member 82. A threaded rod 83 extends downwardly into guide 82 and is provided with a bushing 84, the latter resting upon a coil spring 85. The upper end of rod 83 is provided with an adjustable semi-spherical member 86 which is received in a similarly shaped recess in bracket 87, the latter being secured to front plate 55 of the mastic nozzle. Referring to Figure 1, it will be noted that one such mounting is provided on each side of the axis of the apparatus. Near the lower end of frame 76 and in the center thereof is a bracket member 88 through the center of which a pin 89 extends downwardly through a suitable hole in plate 80. A lower bracket 90 extends forwardly from plate 55 and is provided with a pair of rollers 102 between which pin 89 may move vertically without friction. A similar arrangement, represented by upper bracket members 103 and pin 104 on frame 76, and upper roller bracket 105 on plate 55, is provided at the top of the frame. By this construction, the mastic nozzle and frame 76 are permitted free relative vertical motion restrained by spring mountings 81 so that when rollers 79, for example, ride up over an enlargement in line 19 and thus lift frame 76, the extrusion nozzle carried by plate 55 will remain concentric with the pipe. At the same time the nozzle will be urged forwardly by the pin and roller connections to follow frame 76, which is connected to tractor unit 10 by means which will be described below.

In this embodiment the lower side of plate 80 forms a support for a variable speed motor 91 adapted to drive a speed reducer 92 by means of multiple belts 93. An extensible splined shaft 94, provided with universal joints 95, extends upwardly from speed reducer 92 and drives a worm 96 which engages a worm gear 97 on one shaft 67 of the mastic pump (Figure 2). It is apparent that shaft 94 must be extensible in order to accommodate the relative vertical motion which will take place between frame 76 which supports the motor and reducing gear, and the mastic nozzle which supports the mastic pump.

As stated above, this apparatus is designed to operate on lines which may be relatively crooked and which may contain bends of relatively short radius. To provide desired flexibility a second rectangular yoke 98 is pivotally secured in the center of its side members, as at 99, to the rear ends of side bars 17 of tractor unit 10. The upper and lower members of yoke 98 are pivotally connected, as at 100, to forwardly extending brackets 101 on the top and bottom of frame 76. This provides a flexible connection in the nature of a universal joint between the tractor unit 10 and frame 76 so that the apparatus is enabled to follow bends or changes in direction in the pipe line 19 without binding of the various parts and without side thrust on the concentric mastic nozzle so that a truly uniform thickness of mastic is produced upon pipe 19.

In operation, motors 14 and 91 are supplied from a suitable source of electric power such as a portable engine driven generator which travels along beside the line 19 to be coated. The speeds of these motors are controlled by suitable well-known means so that mastic will be extruded through the nozzle onto the pipe 19 at a rate corresponding to the advance of the tractor unit 10 along the pipe. As stated above, pipe 19 is first cleaned of dirt, rust or other foreign materials, and is preferably given a priming coat of a nature which will insure a satisfactory bond between the bituminous binder of the mastic coating and the metal of the pipe. The mastic pump is maintained at a temperature which will not cause chilling of the mastic by means of the gas burners 71, and the extrusion nozzle is heated by means of the electric resistance units 63, which may also be supplied from the electric power source for the motors 14 and 91.

It will be apparent that the apparatus just described possesses advantages in flexibility of operation and uniformity and superiority of the finished coating that are not possessed by prior art devices which can function only to apply thin coatings of liquid material which later harden upon drying or cooling, and by those wrapping devices which apply overlapping helically wound tapes and ribbons. If it is desired that this apparatus be used at a central location the tractor unit may be secured to a stationary base and the pipe lengths supplied to it on suitable roller supports so that they are successively and continuously urged into and through the extrusion nozzle to apply a coating. The primary purpose of this apparatus, however, is to apply to a pipe line of considerable length, on the order of thousands of feet, a continuous homogeneous coating, ranging from ⅜ to ¾ inch in thickness, of a dense and only slightly plastic heated bituminous mastic, without voids or interruptions in the coating due to welds, couplers and the like.

Although a specific construction of this device has been illustrated and described it will be appreciated that many modifications and changes may be made in its various parts without departing from the invention and all such changes that come within the scope of the appended claims are embraced thereby.

We claim:

1. In a device for continuously applying a coating of mastic to a pipe, a nozzle having a longitudinal bore spaced from said pipe, a mastic entrance opening for said nozzle transverse to the axis of said bore, a mastic pump communicating with said entrance opening, tractor means for engaging said pipe and moving said device relatively thereto, and means forming a flexible connection between said nozzle and said tractor means.

2. A device according to claim 1, in which said flexible connection means comprises a frame supported by said pipe independently of said nozzle and said tractor, and means on said frame resiliently connecting it to said nozzle to permit relative motion transverse to said pipe axis.

3. A device according to claim 1, in which said flexible connection means comprises a frame supported by said pipe independently of said nozzle and said tractor, and means for driving said mastic pump carried by said frame.

4. A device according to claim 1 in which said tractor means comprises a frame, opposed rolls in said frame adapted resiliently to engage the top and bottom of said pipe, hinged means for supporting said rolls so that enlargements in said pipe will pass therethrough, and means for positively rotating said rolls to move them relatively to said pipe.

5. In a device for continuously applying a coating of mastic to a stationary pipe, a nozzle having a longitudinal bore spaced from said pipe, an enlargement in said bore intermediate the ends thereof, a mastic entrance opening for said enlargement, a mastic pump communicating with said entrance opening, tractor means for engaging said pipe and advancing axially therealong, and means connecting said tractor means and said nozzle to advance the latter along said pipe to coat the same.

6. A device according to claim 5, in which said last named means is flexible to allow relative transverse and angular movement between said tractor unit and said nozzle but is effective to preserve their longitudinal spacing.

7. A device according to claim 5, with the addition of means supported by said pipe independently of said nozzle and said mastic pump and effective to drive said pump.

8. A device according to claim 5, in which the connecting means for said tractor and said nozzle comprise a pair of axially spaced yokes pivotally connected to each other and to said tractor unit.

9. A device according to claim 5, in which the connecting means for said tractor and said nozzle comprise a pair of axially spaced yokes pivotally connected to each other and to said tractor unit and resiliently connected to said nozzle to permit relative displacement thereof transverse to said pipe axis.

10. In combination wtih a nozzle for extruding a stiff plastic material, such as a bituminous mastic, upon a pipe to produce a thick coating upon said pipe, said nozzle having an elongated inlet to receive said mastic, an elongated positive displacement pump comprising means forming a pair of opposed, parallel, semi-cylindrical recesses, a shaft in each of said recesses and coaxial therewith, means connecting said shafts to keep them in synchronism, and a multi-lobed impeller on each of said shafts, the radial projections of one impeller meshing with the recesses of the other to urge said plastic material into and through the elongated space between said shafts at a uniform rate with respect to the length of said impellers.

11. In combination with a coating device designed to be advanced axially along a pipe, a tractor unit comprising a frame transverse to said pipe axis, a pair of hinged arms extending in each direction along said pipe at the top of said frame, a second pair of similarly hinged arms at the bottom of said frame, a traction roll supported by each arm, resilient means urging said upper and lower arms together so that said rolls will engage said pipe, drive means for each of said rolls, a slotted member on one side of said frame and extending in each direction along the side of said pipe and pivoted links connecting each of said arms to said slotted member, so constructed and arranged that each opposed pair of said arms will move upwardly and downwardly through the same angle when said rolls are moved apart by an enlargement in said pipe, thereby keeping the axis of said frame in the same horizontal plane as the axis of said pipe.

12. A combination as defined in claim 11, in which said drive means for said rolls comprises an upper transverse shaft, sprockets and chains connecting said shaft to said upper rolls, a lower transverse shaft, sprockets and chains connecting said lower shaft to said lower rolls, a prime mover on said frame, and sprockets and chains connecting said prime mover to said upper and lower transverse shafts.

LLOYD BRYAN.
WILLIAM R. POSTLEWAITE.